(12) United States Patent
Batra et al.

(10) Patent No.: US 11,651,536 B2
(45) Date of Patent: May 16, 2023

(54) DIRECTIONAL PATTERN GENERATION FOR DIGITAL IMAGES

(71) Applicant: Adobe Inc., San Jose, CA (US)

(72) Inventors: Vineet Batra, Pitam Pura (IN); Praveen Kumar Dhanuka, Howrah (IN); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/476,834

(22) Filed: Sep. 16, 2021

(65) Prior Publication Data

US 2023/0100830 A1    Mar. 30, 2023

(51) Int. Cl.
| | | |
|---|---|---|
| *G06T 11/40* | (2006.01) | |
| *G06T 11/00* | (2006.01) | |
| *G06T 11/20* | (2006.01) | |
| *G06F 3/048* | (2013.01) | |
| *G06F 3/04812* | (2022.01) | |

(52) U.S. Cl.
CPC .......... *G06T 11/40* (2013.01); *G06F 3/04812* (2013.01)

(58) Field of Classification Search
CPC ...... G06T 11/001; G06T 11/20; G06T 11/203; G06T 11/40; G06T 11/60; G06T 11/80; G06T 7/543; G06T 2207/20192; G06T 2207/20212; G06T 2207/172; G06T 2200/24; G06T 2200/32; G06T 2210/56; G06T 2219/2021; G06T 2219/2024; G06T 2210/00

See application file for complete search history.

(56) References Cited

U.S. PATENT DOCUMENTS

| | | |
|---|---|---|
| 6,804,573 B2 | 10/2004 | Goldman |
| 6,822,652 B1 | 11/2004 | Browne et al. |
| 7,495,670 B1 | 2/2009 | Manzari |

(Continued)

FOREIGN PATENT DOCUMENTS

CN    102538706 A   * 11/2011   ............. G06T 7/521

OTHER PUBLICATIONS

"Document management—Portable document format—Part 1: PDF 1.7 First Edition", Adobe Systems Incorporated [retrieved Aug. 17, 2021]. Retrieved from the Internet <https://www.adobe.com/content/dam/acom/en/devnet/pdf/pdfs/PDF32000_2008.pdf>., Jul. 1, 2008, 756 Pages.

(Continued)

*Primary Examiner* — Wesner Sajous
(74) *Attorney, Agent, or Firm* — FIG. 1 Patents

(57) ABSTRACT

Directional pattern generation techniques are described for digital images as implemented by a directional pattern system. In an implementation, a user input is received to specify a direction with respect to the object. A directional pattern system then fills the object using a directional pattern based on the contours of the object as well as the user-specified direction. To do so, the directional pattern system generates a directional vector field that specifies directions with respect to corresponding locations within the field defined by a mesh. Uniform field embedding is employed to transfer the directional vector field to a grid by superimposing the grid onto the mesh of the directional vector field. The directional pattern system then generates the directional pattern within the object by filling the grid with one or more pattern cells.

20 Claims, 12 Drawing Sheets

(56) References Cited

U.S. PATENT DOCUMENTS

| | | | |
|---|---|---|---|
| 8,549,420 | B1 | 10/2013 | Tibbett |
| 8,674,995 | B1 | 3/2014 | Asente |
| 9,019,303 | B2 | 4/2015 | Lee et al. |
| 9,200,397 | B2 | 12/2015 | Goldman |
| 10,482,622 | B2 * | 11/2019 | Worthington ............ G06T 7/11 |
| 10,832,446 | B2 | 11/2020 | Phogat et al. |
| 11,164,343 | B1 * | 11/2021 | Batra ................... G06T 11/001 |
| 11,610,350 | | 3/2023 | Batra et al. |
| 2005/0168476 | A1 * | 8/2005 | Levene .................. G06T 11/60 345/582 |
| 2006/0290695 | A1 | 12/2006 | Salomie |
| 2008/0297514 | A1 | 12/2008 | Pedersen et al. |
| 2011/0175916 | A1 | 7/2011 | Noris et al. |
| 2011/0216976 | A1 * | 9/2011 | Rother .................. G06V 10/26 382/173 |
| 2013/0120426 | A1 * | 5/2013 | DiVerdi ................ G06T 11/203 345/589 |
| 2015/0371417 | A1 | 12/2015 | Angelov et al. |
| 2015/0378450 | A1 | 12/2015 | Petkov et al. |
| 2016/0350942 | A1 * | 12/2016 | Asente ................. G06T 11/001 |
| 2017/0372455 | A1 * | 12/2017 | Winnemoeller .......... G06T 7/13 |
| 2018/0285638 | A1 | 10/2018 | Lelore et al. |
| 2018/0322612 | A1 * | 11/2018 | Asente ................. G06T 3/0081 |
| 2020/0219287 | A1 | 7/2020 | Phogat et al. |
| 2020/0242823 | A1 | 7/2020 | Gehlaut et al. |
| 2021/0271474 | A1 | 9/2021 | Batra et al. |
| 2023/0058129 | A1 | 2/2023 | Batra et al. |

OTHER PUBLICATIONS

Batra, Vineet et al., "U.S. Application as Filed", U.S. Appl. No. 17/504,814, filed Oct. 19, 2021, 59 pages.

Blum, Harry et al., "Shape description using weighted symmetric axis features", Pattern Recognition, vol. 10, No. 3 [retrieved Aug. 17, 2021]. Retrieved from the Internet <http://www.sci.utah.edu/~gerig/CS7960-S2010/handouts/shapedescriptors_blum.pdf>., 1978, 17 Pages.

Brandt, Jonathan W., "Theory and application of the skeleton representation of continuous shapes", Doctoral dissertation, University of California, Davis, Division of Computer Science 4455 Chem. Annex Davis, CA, United States [retrieved Oct. 20, 2021], UMI Order No. GAX92-17565, 1992, 219 pages.

Choi, Hyeong In et al., "Mathematical theory of medial axis transform", Pacific Journal of Mathematics vol. 181, No. 1 [retrieved Aug. 17, 2021]. Retrieved from the Internet <https://msp.org/pjm/1997/181-1/pjm-v181-n1-p02-p.pdf>., Nov. 1997, 32 Pages.

Choi, Hyeong In et al., "New Algorithm for Medial Axis Transform of Plane Domain", Graphical Models and Image Processing, vol. 59, No. 6 [retrieved Oct. 6, 2021]. Retrieved from the Internet <https://doi.org/10.1006/gmip.1997.0444>., Nov. 1997, 21 pages.

Lee, D. T., "Medial Axis Transformation of a Planar Shape", IEEE Transactions on Pattern Analysis and Machine Intelligence, vol. PAMI-4, No. 4 [retrieved Aug. 17, 2021]. Retrieved from the Internet <https://doi.org/10.1109/TPAMI.1982.4767267>., Jul. 1982, 7 Pages.

Schneider, Philip J., "Solving the nearest-point-on-curve problem", in: Philip J. Schneider, Graphics Gems, Academic Press Inc., Massachusetts [retrieved Aug. 17, 2021]. Retrieved from the Internet <http://inis.jinr.ru/sl/vol1/CMC/Graphics_Gems_1,ed_A.Glassner.pdf>., Aug. 1990, pp. 607-611.

Shewchuk, Jonathan R., "Triangle: Engineering a 2D Quality Mesh Generator and Delaunay Triangulator", Workshop on Applied Computational Geometry. Springer, Berlin [retrieved Apr. 13, 2021]. Retrieved from the Internet <https://doi.org/10.1007/BFb0014497>., May 1996, 10 pages.

U.S. Appl. No. 17/394,985, "Non-Final Office Action", U.S. Appl. No. 17/394,985, dated Oct. 20, 2022, 30 pages.

U.S. Appl. No. 17/504,814, "Non-Final Office Action", U.S. Appl. No. 17/504,814, dated Jan. 3, 2023, 23 pages.

De Goes, Fernando, et al., "Vector Field Processing on Triangle Meshes", In SIGGRAPH Asia 2015 Courses (SA 15) [Oct. 27 2022]. Retrieved from the Internet <https://doi.org/10.1145/2897826.2927303>, Nov. 2, 2015, 49 pages.

U.S. Appl. No. 17/394,985, "Corrected Notice of Allowability", U.S. Appl. No. 17/394,985, dated Feb. 23, 2023, 2 pages.

U.S. Appl. No. 17/394,985, "Notice of Allowance", U.S. Appl. No. 17/394,985, filed Feb. 3, 2023, 12 pages.

* cited by examiner

DIRECTIONAL PATTERN GENERATION FOR DIGITAL IMAGES

BACKGROUND

Patterns are a fundamental construct in the creation of digital images. Because of this, patterns are incorporated in a multitude of graphic design workflows, examples of which include screen design, apparel design, packaging, webpages, user interfaces, logos, and so forth. Conventional techniques implemented by image processing systems used to create these patterns, however, encounter numerous challenges that have a direct effect on operational efficiency of computing devices that implement these systems as well as on user efficiency in creating visually pleasing patterns.

A pattern, in most instances, is created based on repeating arrangements of one or more shapes known as a pattern cell. To do so in a manner that is visually pleasing, expertise is involved to ensure that the pattern has a regular and uniform appearance. As a result, as the number of shapes involved in the pattern increases, so too does the complexity in ensuring this regular and uniform appearance. Additionally, changes to the pattern, such as to increase spacing, sizing, or shapes that make up the pattern using conventional techniques involves significant amounts of manually repetitive operations to do so. These challenges are increased when additional features are added to the pattern which results in an failure of conventional image processing systems to support these features, such as to follow an arbitrary direction, fill a particular shape, and so on. As a result, conventional techniques as implemented by computing devices are incapable of addressing these challenges, thereby requiring manual interaction to specify each aspect of the pattern individually and thus result in inefficient use of computational resources.

SUMMARY

Directional pattern generation techniques are described for digital images as implemented by a directional pattern system. The directional pattern system generates a directional pattern to fill an object based on the contours of the object and a direction of flow. In one example, an input is received via a user interface that specifies a direction in relation to an object in a user interface. The directional pattern system then generates a directional vector field that specifies directions at corresponding locations (i.e., field vertexes) of a mesh, e.g., a triangle mesh using constrained Delaunay triangulation (CDT).

Uniform field embedding is then employed by the directional pattern system to transfer the directional vector field to a grid of a specified type (e.g., a regular grid that is rectangular, triangular, hexagonal, etc.) by superimposing the grid onto the mesh of the directional vector field. Field values from the directional vector field are then sampled at corresponding grid vertexes of the grid, e.g., using barycentric interpolation. The directional pattern system then generates the directional pattern within the object by filling the grid with one or more pattern cells, automatically and without user intervention. The pattern cells, for instance, are placed at grid vertexes within the grid as having rotations of a principal axis of the cell based on directions defined at respective grid vertexes. The directional pattern is then rendered within the object for display in the user interface by a display device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
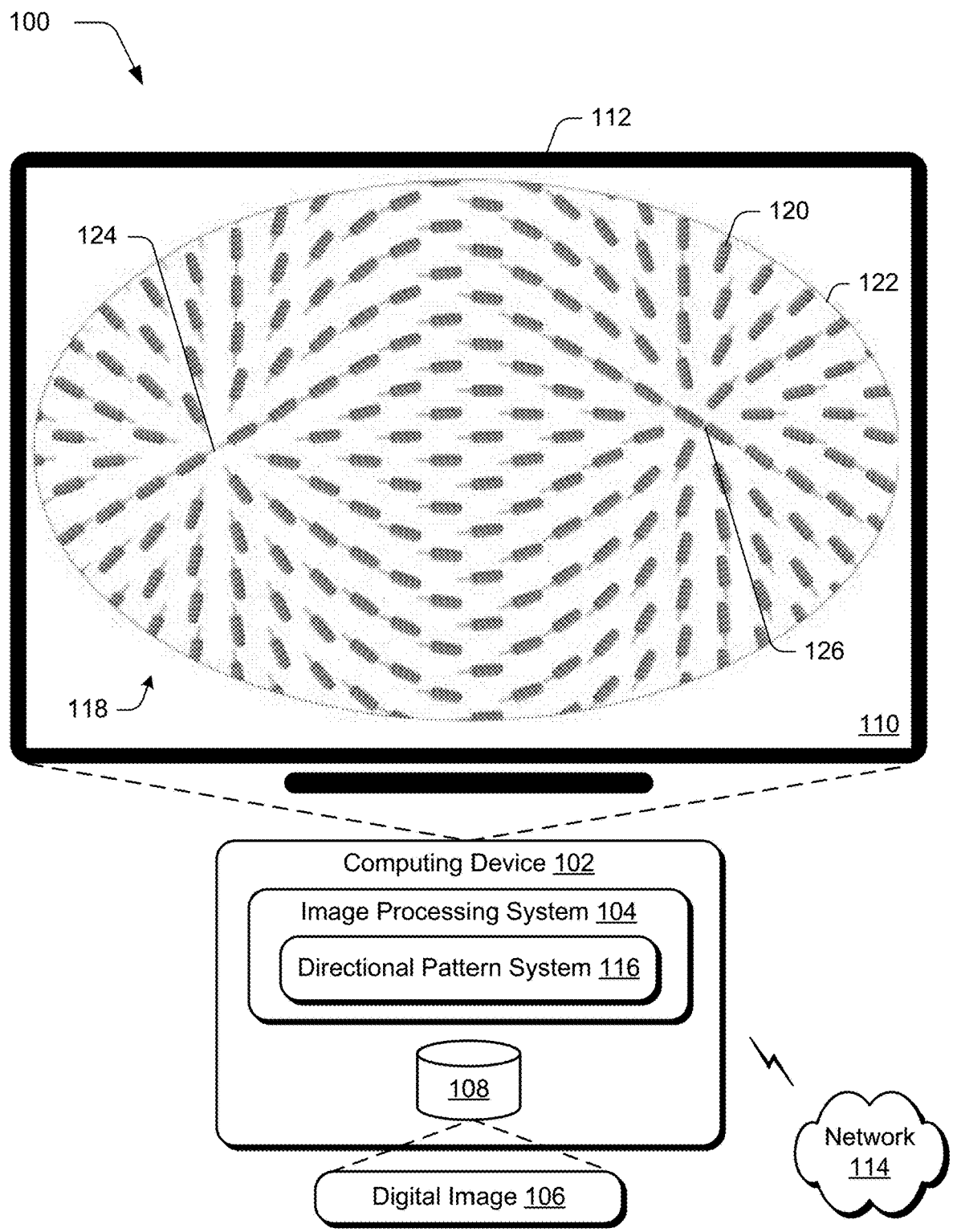
FIG. 1 is an illustration of a digital medium environment in an example implementation that is operable to employ directional pattern generation techniques described herein.

Patterns are a fundamental construct in the creation of digital images. Conventional techniques as implemented by image processing systems used to create these patterns, however, encounter numerous challenges that have a direct effect on operational efficiency of computing devices that implement these techniques as well as on user efficiency in creating visually pleasing patterns. In one such conventional example, shapes are packed within an interior of an object. However, in this example the packing of the shapes in not regular or uniform and as such does not exhibit a pattern. Another conventional technique involves manual positioning of cells within the object and because of this any modification to any part of the pattern defined by these cells requires this manual positioning to "start over" again.

Accordingly, directional pattern generation techniques are described that overcome conventional operational challenges and improve user and computing device efficiency in creating directional patterns as part of digital images. The conventional definition of a pattern includes a variety of basic attributes, a first of which is referred to as a "pattern cell." The pattern cell includes a shape or shapes (e.g., vectors, raster, etc.) that are replicated at defined horizontal and/or vertical intervals to generate the pattern, e.g., to "fill" an interior of object in a digital image. Object examples include a vector object, raster object, defined region within a user interface, an entirety of a digital image, and so on.

A "step size" is defined as part of the convention pattern definition as the interval (i.e., amount of spacing) to be employed between the pattern cells. In one instance, the step size is regular and uniform such that steps in horizontal and/or vertical directions have the same amount. In other instances, the step size varies, such as to increase or decrease spacing by successively defined amounts, which may also be adjusted using regular intervals. A transformation matrix may also be applied to a pattern cell when filling the interior of the object. Of note, the conventional pattern definition and arrangement of pattern cells is independent of an object to be filled. As such, use of a conventional pattern definition to fill an object results in an arrangement of pattern cells that is independent of contours of the object being filled and does not exhibit a direction.

Therefore, in the directional pattern generation techniques described herein directional patterns are generated that take into account a variety of considerations. In a first example, directions are specified to direct a flow of the pattern within the object. In another example, contours of an object being filled are considered to direct the flow of the pattern within the object to follow the contours.

In an implementation, a user input is received to specify a direction with respect to the object. A directional pattern system then "fills" the object based on the contours of the object as well as the user-specified direction. The directional pattern system also supports an iterative process to support user inputs to change directions, pattern placement, and orientation in real time to automatically generate and display the directional pattern as user inputs are received, which is not possible in conventional techniques.

Specifying the direction with respect to the object is performable in a variety of ways. Examples of direction specification include use of a curve that indicates a direction, a sink that specifies a target direction towards which patterns cells are directed, an emitter that specifies a source in the object from which pattern cells are emitted, and so on.

Based on the input, the directional pattern system generates a directional vector field that specifies directions with respect to corresponding locations (i.e., field vertexes) within the field. To do so, a mesh is generated based on the object, e.g., a triangle mesh using constrained Delaunay triangulation (CDT). The specified directions are used to establish boundary conditions within the mesh. For the curve example above, a tangential vector field is established with respect to the curve. For the sink and emitter examples above, discrete points used to establish locations of these features within the object are used to specify boundary conditions of the sink and emitters, e.g., directions toward the sink or away from the emitters. The directional vector field is then generated using the mesh as a biharmonic solve by the directional pattern system to compute tangent directions at each vertex in the generated mesh using the above boundary conditions.

In some instances, the directional vector field at this point does not form a regular and uniform mesh. For example, although a flow field used to define directions of vertices within the directional vector field is uniform with respect to the directions, the mesh itself is adaptively sub-divided to ensure smoothness of the directions and thus does not have regular or uniform spacing with respect to the vertexes. As a result, the directional vector field does not exhibit a pattern, e.g., which is uniform and regular. To address this, uniform field embedding is employed by the directional pattern system to transfer the directional vector field to a grid of a specified type (e.g., a regular grid that is rectangular, triangular, hexagonal, etc.) by superimposing the grid onto the mesh of the directional vector field. Field values from the directional vector field are then sampled at corresponding grid vertexes of the grid, e.g., using barycentric interpolation. Step size (i.e., spacing) within the grid is definable in a variety of ways, such as based on a user input, automatically based on a size of a pattern cell to be used to generate the directional pattern, and so on.

The directional pattern system then generates the directional pattern within the object by filling the grid with one or more pattern cells, automatically and without user intervention. The directional pattern system, for instance, determines a principal axis of the pattern cell, e.g., based on a skeleton generated from the cell. The pattern cell is then placed at grid vertexes within the grid as having rotations of the principal axis based on directions defined at respective grid vertexes. In an implementation, this is performed by tiling a normal pattern with the addition of a rotational component that is computed by averaging rotations (e.g., angular field values) at each grid vertex of the grid. The use of this rotation component leads to alignment of the directional pattern with the directional vector field. The object having the directional pattern is then rendered for display in a user interface by a display device. In this way, the direction pattern system overcome conventional challenges to improve user interaction and computing device operation by automatically generating directional patterns. Further discussion of these and other examples is included in the following section and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ directional pattern generation techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 12.

The computing device 102 is illustrated as including an image processing system 104. The image processing system 104 is implemented at least partially in hardware of the computing device 102 to process and transform a digital image 106, which is illustrated as maintained in a storage device 108 of the computing device 102. Such processing includes creation of the digital image 106, modification of the digital image 106, and rendering of the digital image 106 in a user interface 110 for display, e.g., by a display device 112. Although illustrated as implemented locally at the computing device 102, functionality of the image processing system 104 is also configurable as whole or part via functionality available via the network 114, such as part of a web service or "in the cloud."

An example of functionality incorporated by the image processing system 104 to process the digital image 106 is illustrated as a directional pattern system 116. The directional pattern system 116 is configured to generate a directional pattern 118 using pattern cells 120. Pattern cells 120 specify an entity (e.g., shape) that is replicated to form the directional pattern 118, the illustrated example of which is a popsicle.

The directional pattern system 116 is configured in the illustrated example to generate the directional pattern 118 in the interior of a specified object 122 in a specified direction. To do so, user inputs are received that specify the direction, examples of which are depicted in the user interface 110 as including an emitter 124 that specifies a point, from which, the pattern cells 120 are emitted (e.g., a source of the direction) and a sink 126 that specified a point, to which, the pattern cells are directed, i.e., a target of the direction. The object 122, within which the directional pattern 118 is contained, is taken into account along with the specified direction to generate the directional pattern 118, e.g., as part of a biharmonic solve. These techniques, as implemented by the directional pattern system 116, support real time changes to directions, shapes, pattern cells 120, and so on which is not possible in conventional techniques As a result, the directional pattern system 116 increases user and computational resource efficiency, further discussion of which is included in the following sections.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Directional Pattern Generation

Figure 2:
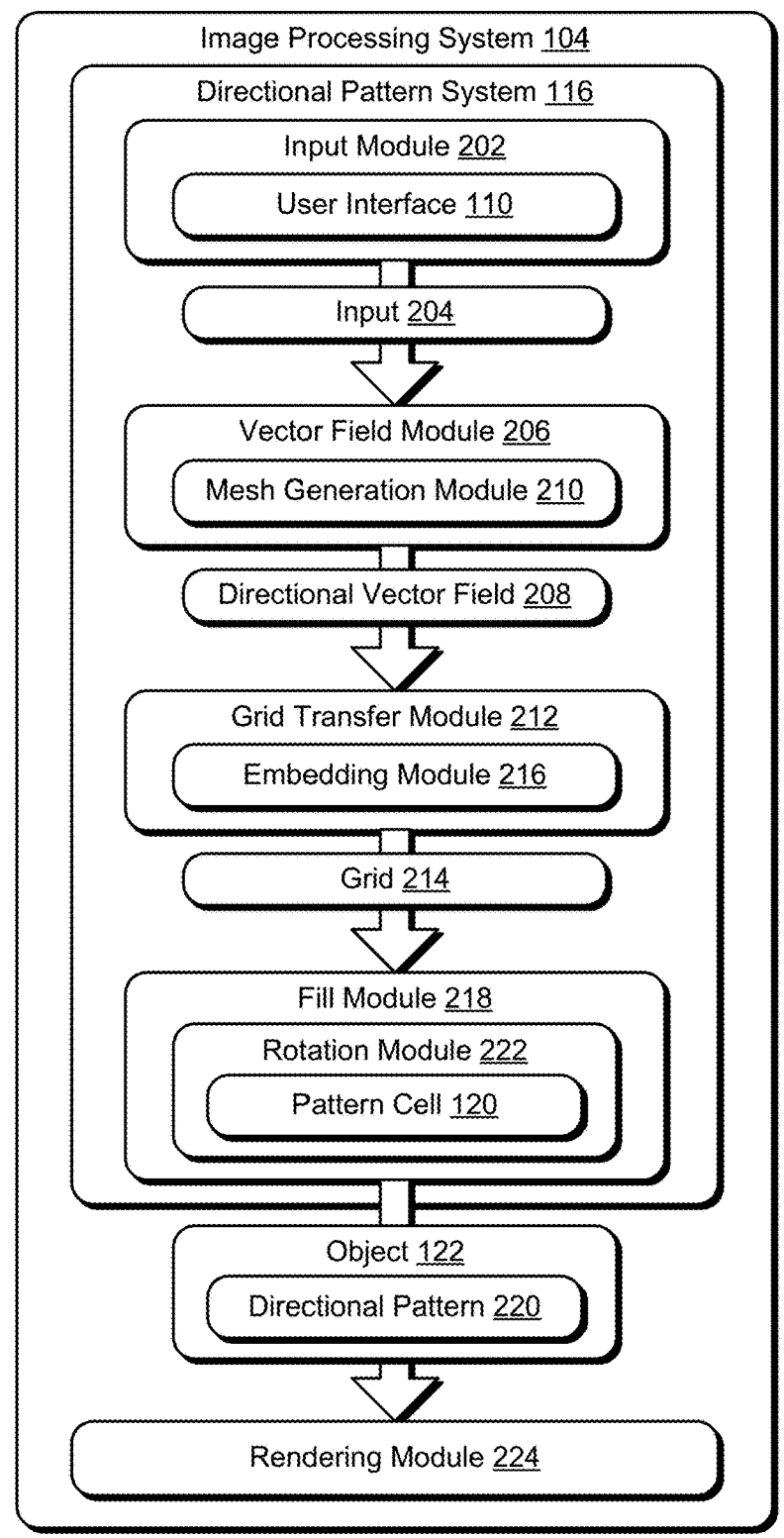
FIG. 2 depicts a system in an example implementation showing operation of the directional pattern system of FIG. 1 in greater detail to generate a directional pattern.
Figure 3:
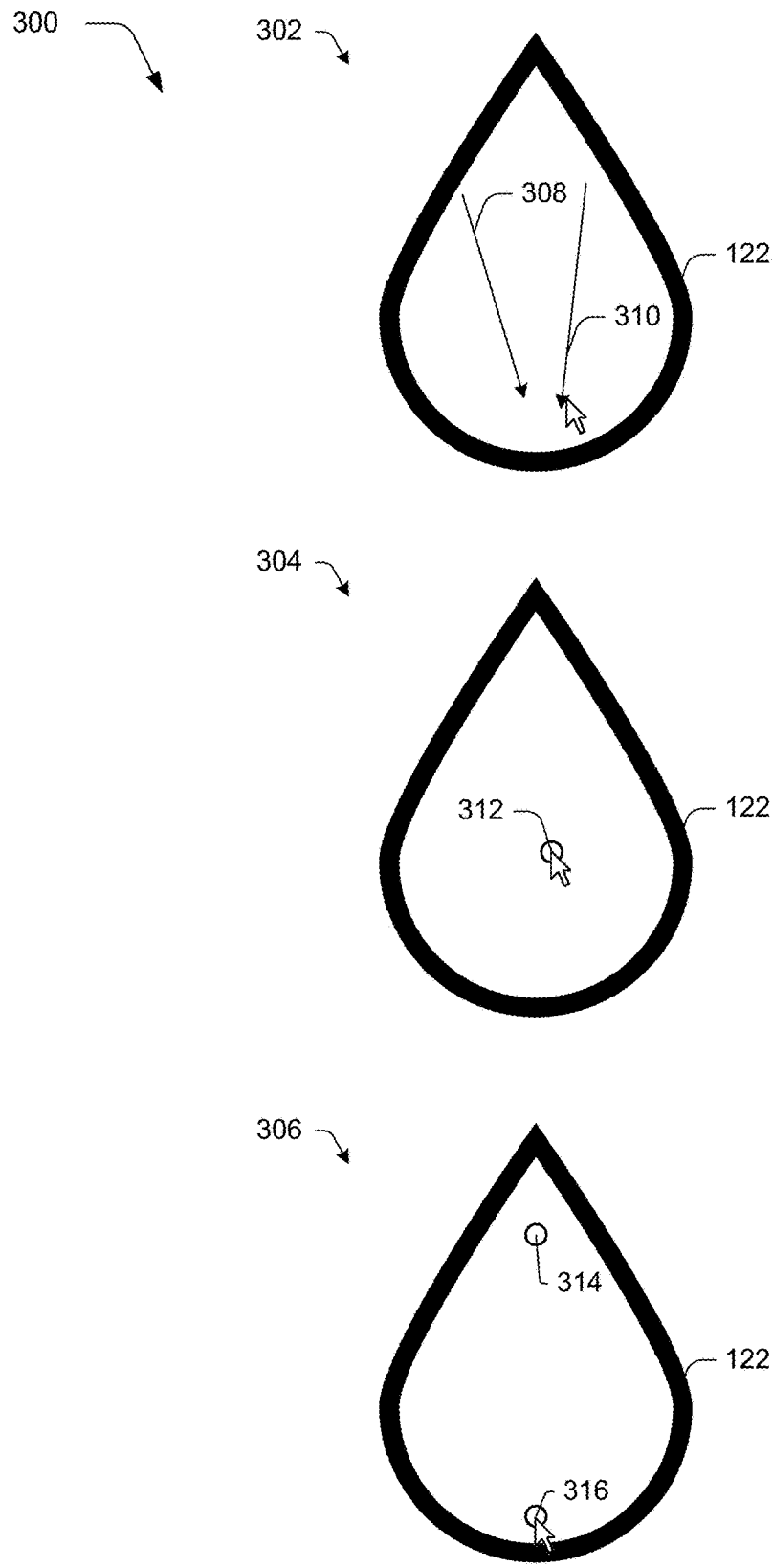
FIG. 3 is an example illustration depicting first, second, and third examples of specifying a direction with respect to an object via interaction with a user interface.
Figure 4:
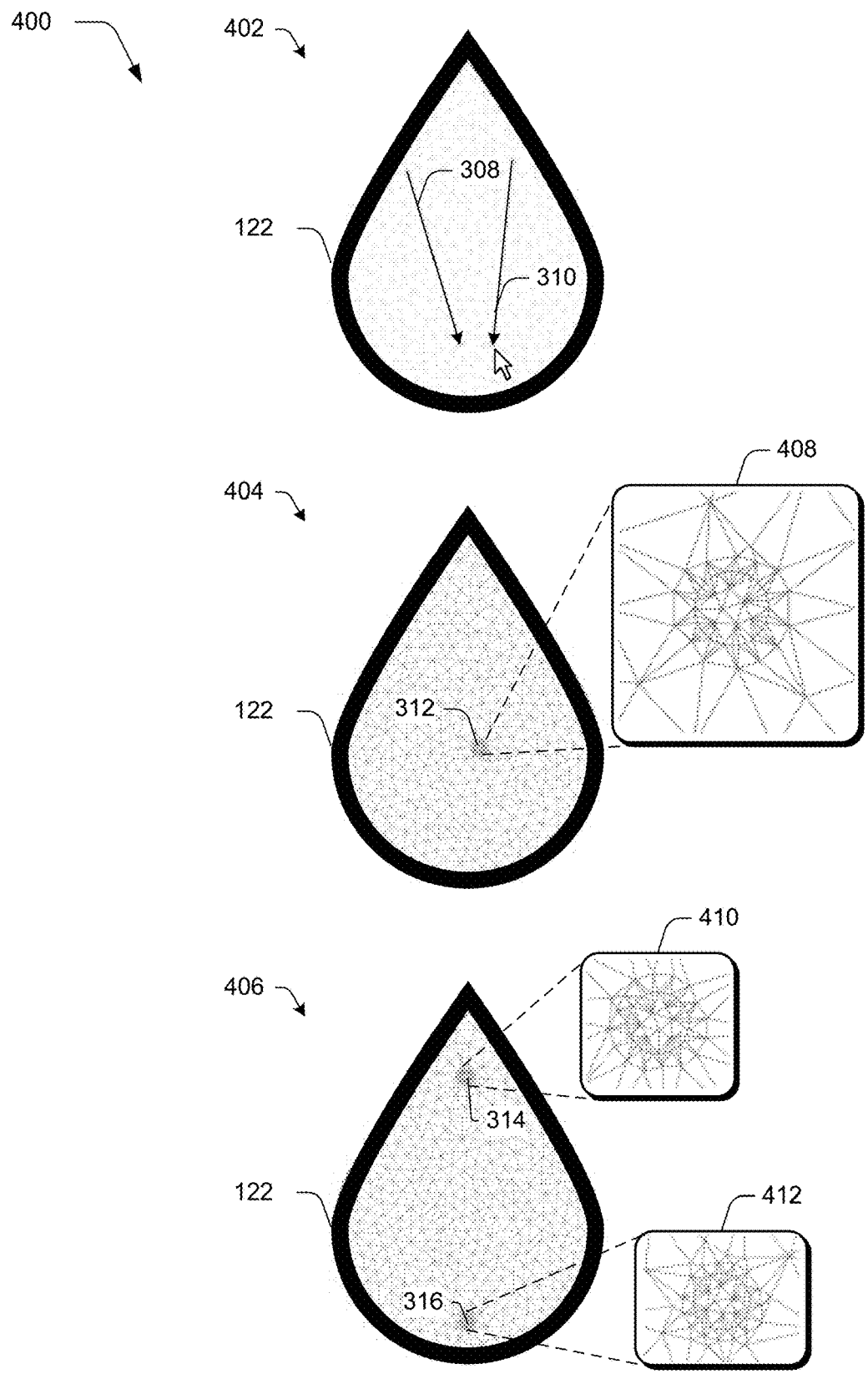
FIG. 4 is an example illustration depicting first, second, and third examples of generating a mesh based at least in part of the specified directions of FIG. 3.
Figure 5:
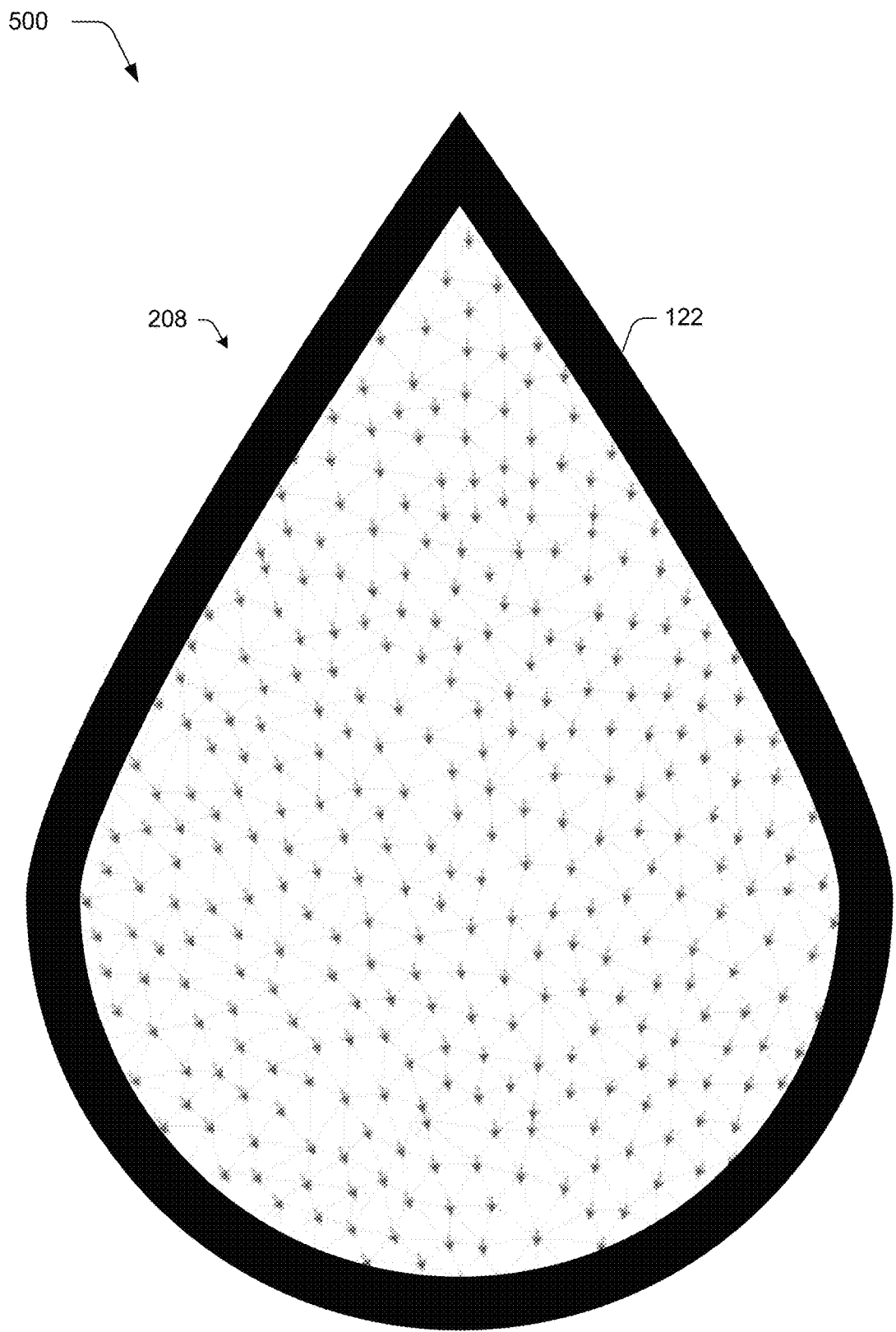
FIG. 5 depicts an example of a directional vector field generated based on the mesh formed for a first example of FIG. 4.
Figure 6:
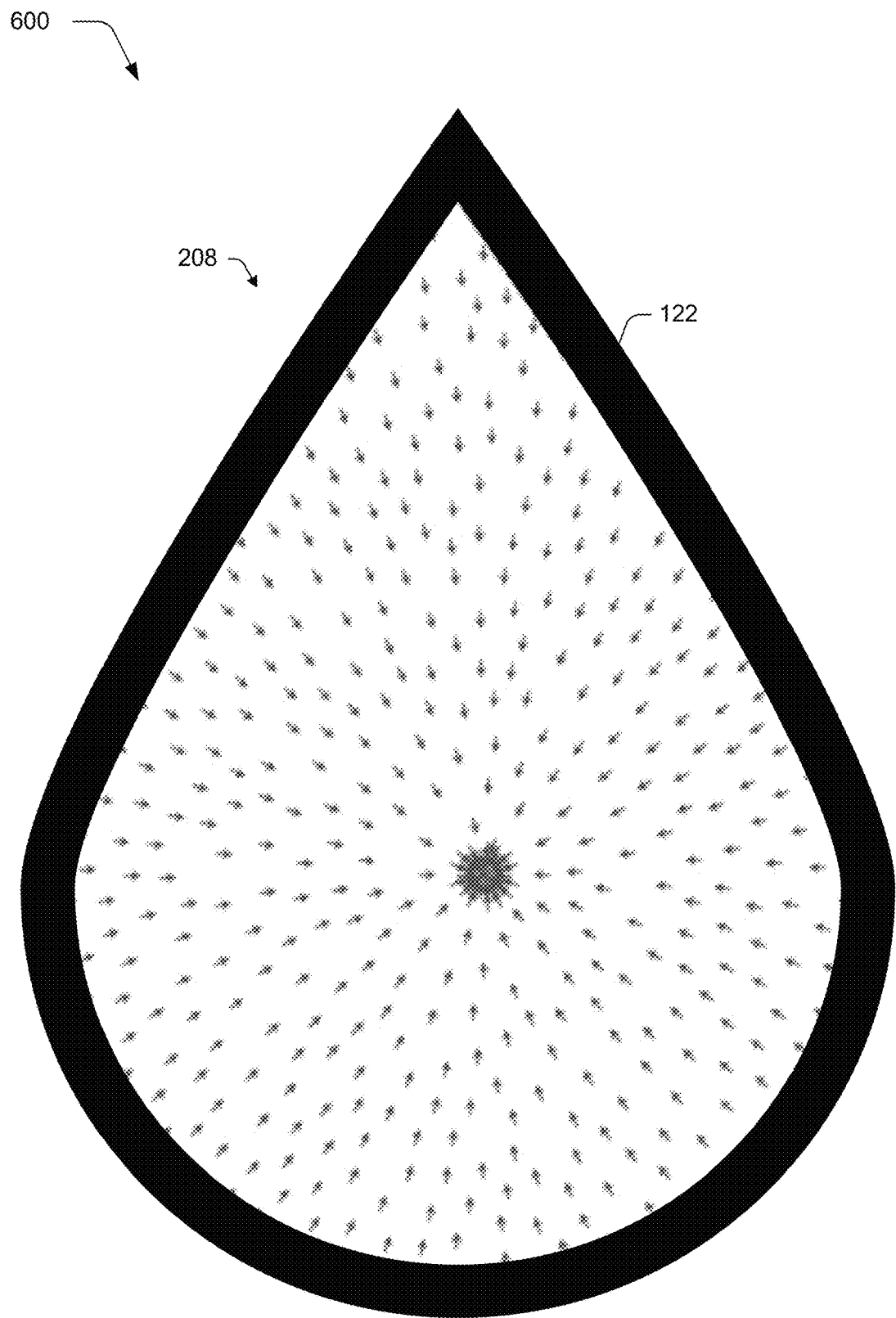
FIG. 6 depicts an example of a directional vector field generated based on the mesh formed for a second example of FIG. 4.
Figure 7:
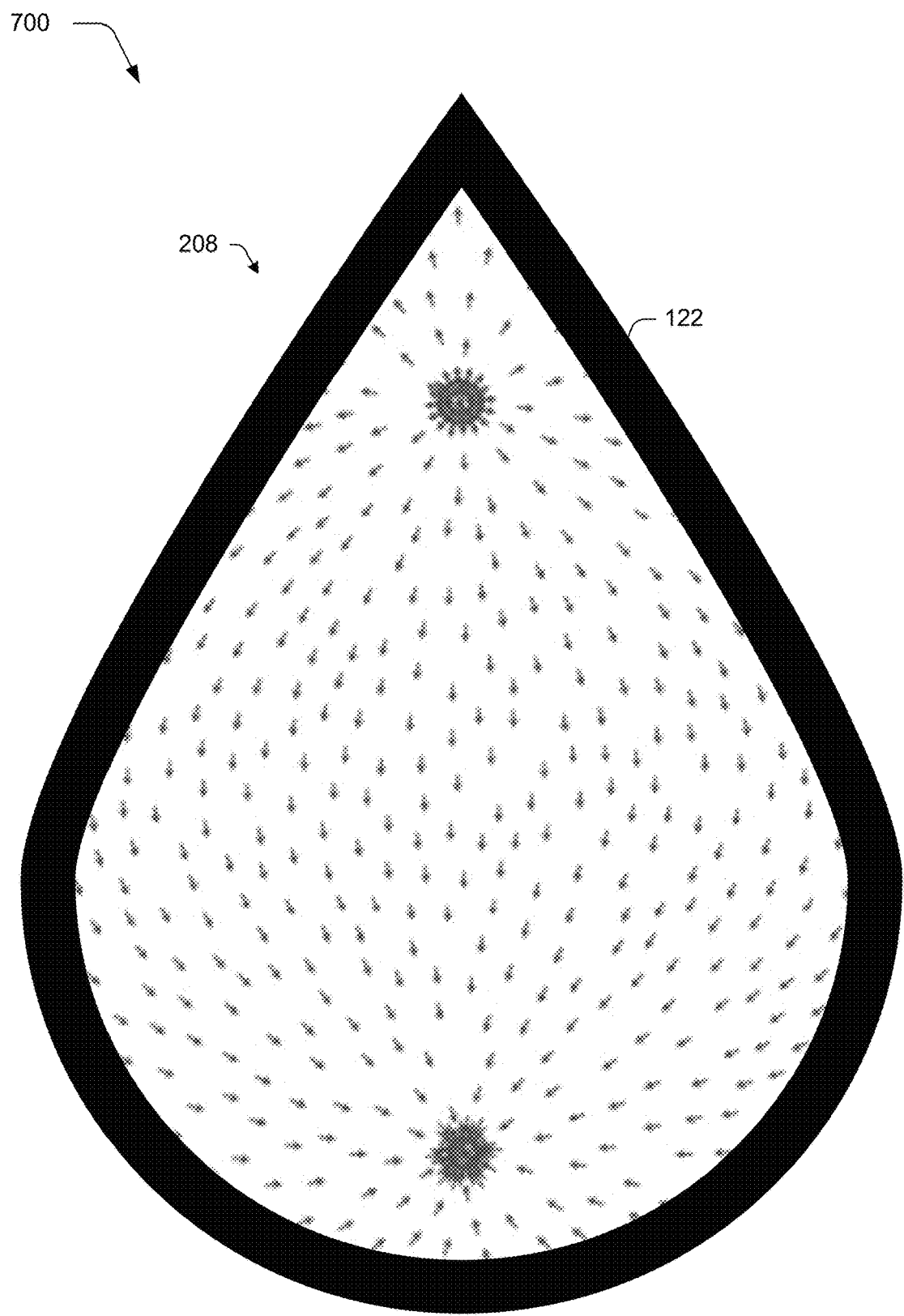
FIG. 7 depicts an example of a directional vector field generated based on the mesh formed for a third example of FIG. 4.
Figure 8:
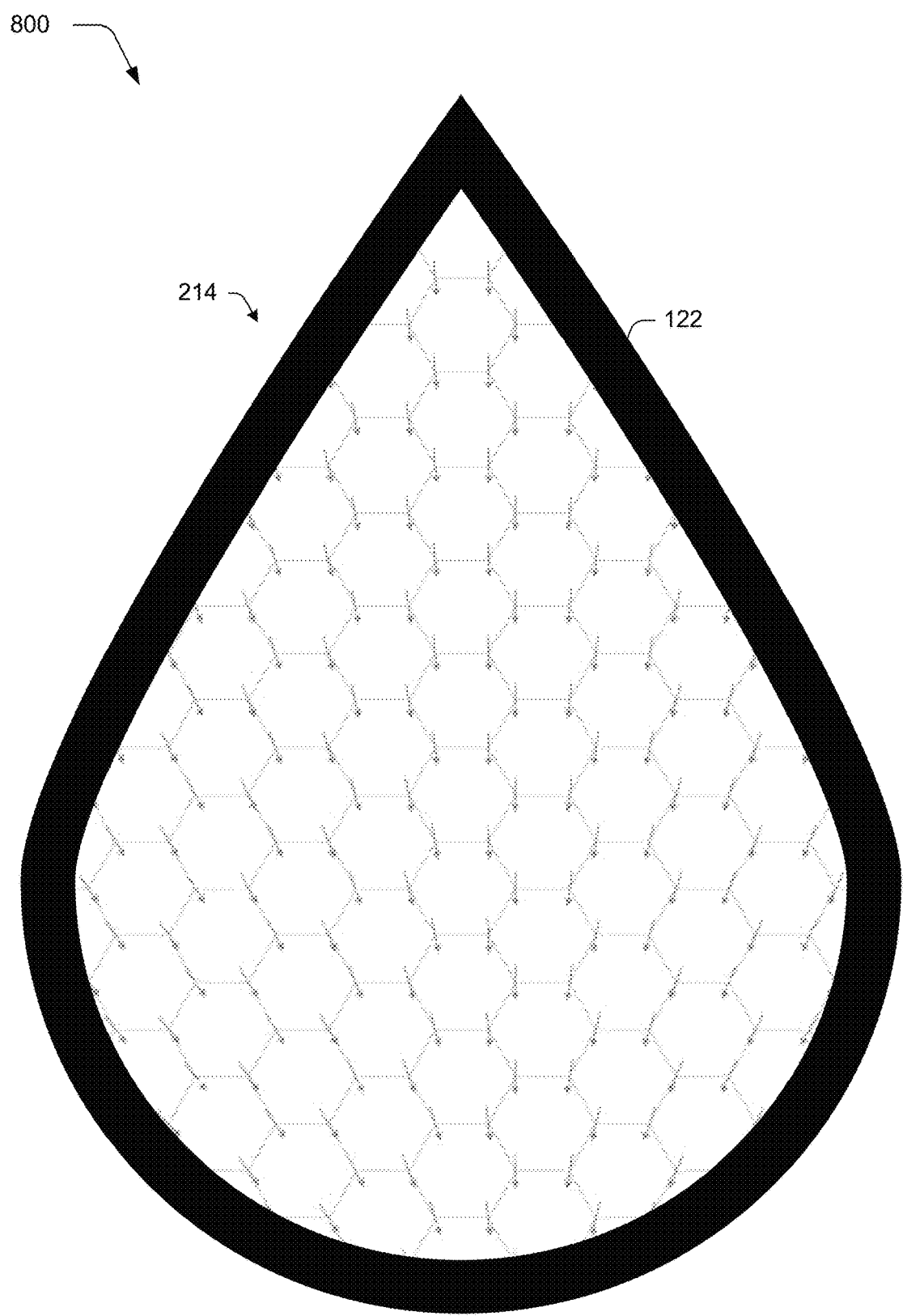
FIG. 8 depicts an example of transfer of a directional vector field to a grid.
Figure 9:
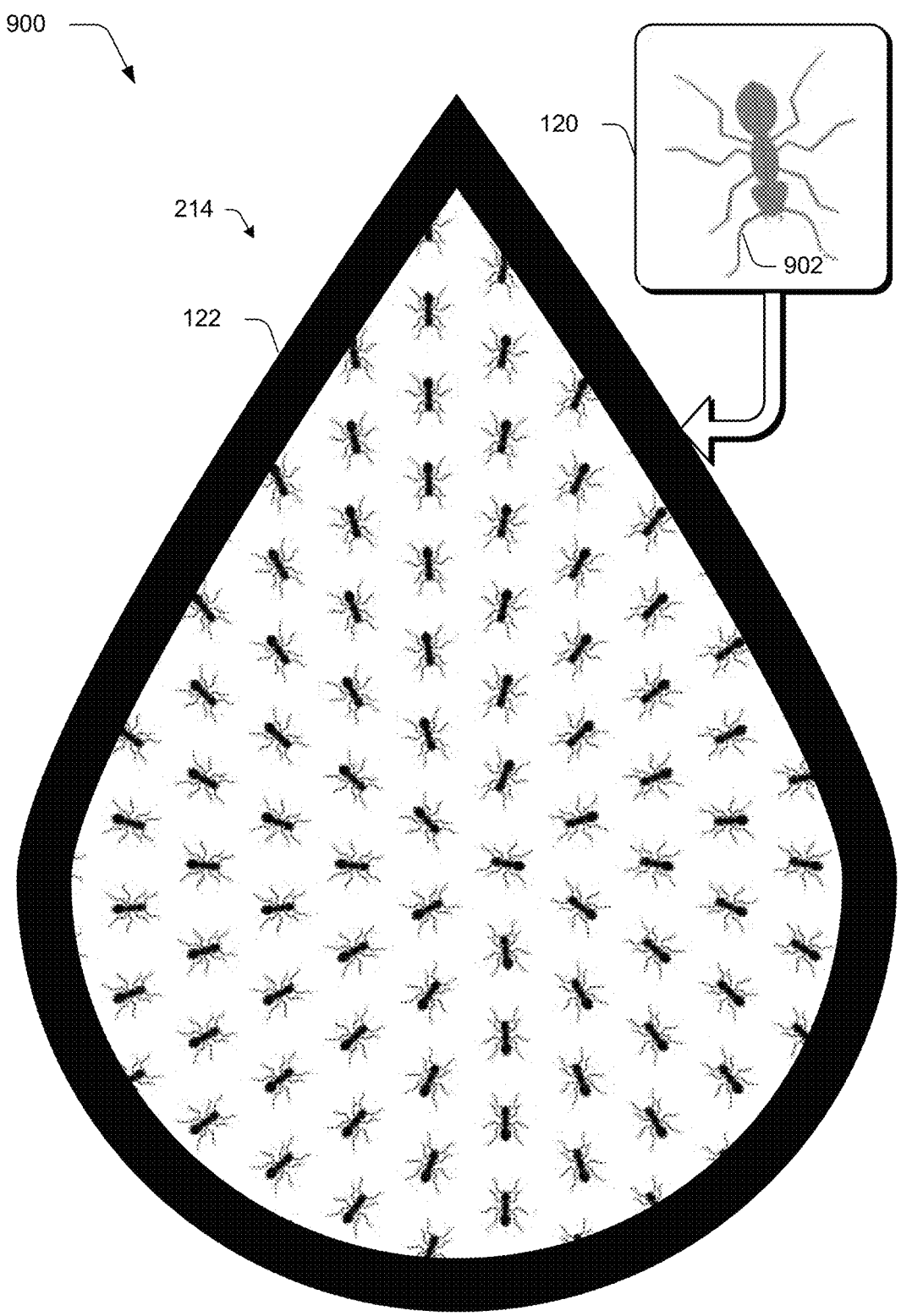
FIG. 9 depicts an example of a directional pattern generated based on the grid of FIG. 8.
Figure 10:
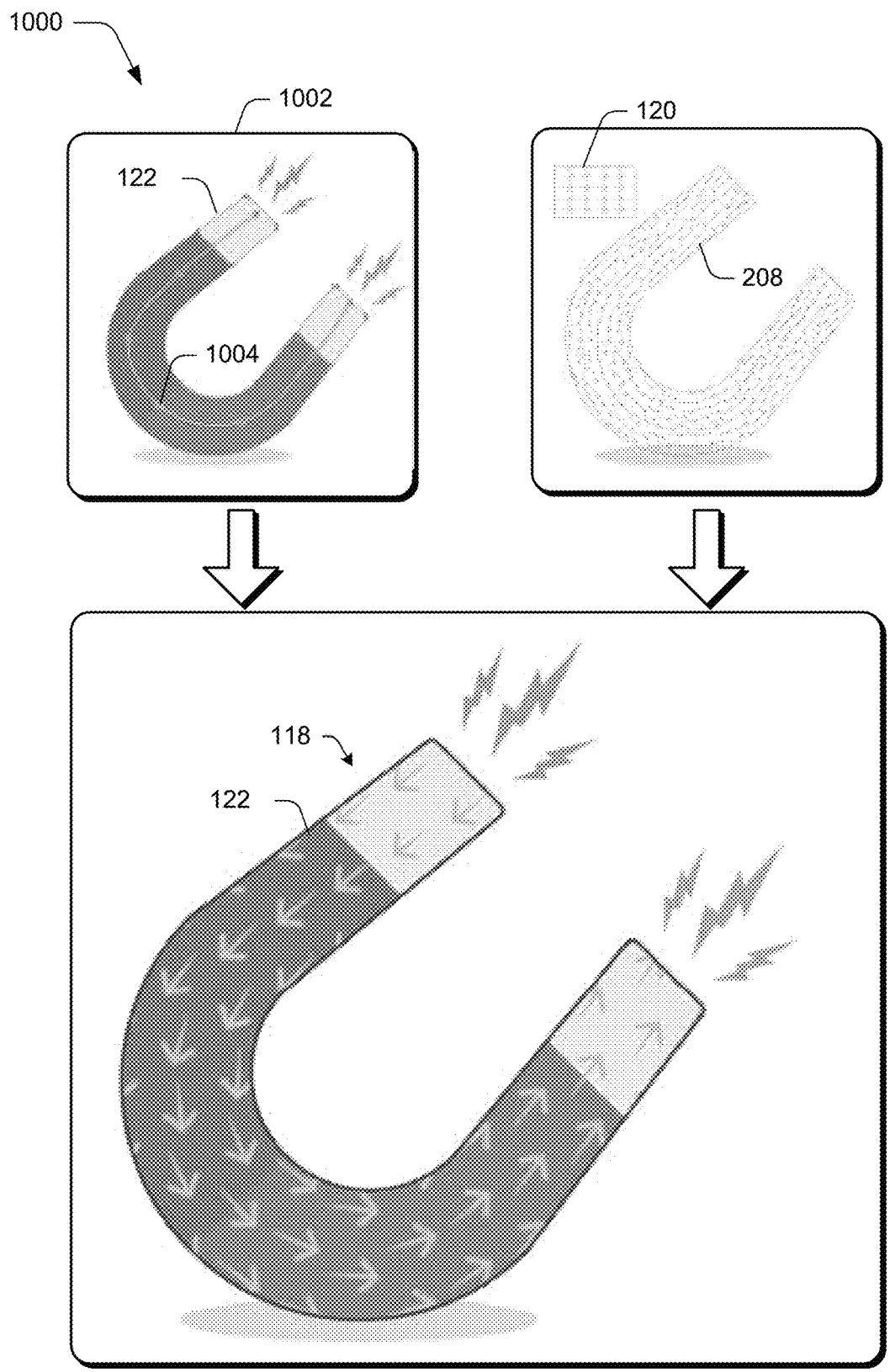
FIG. 10 depicts another example implementation of directional pattern generation.
Figure 11:
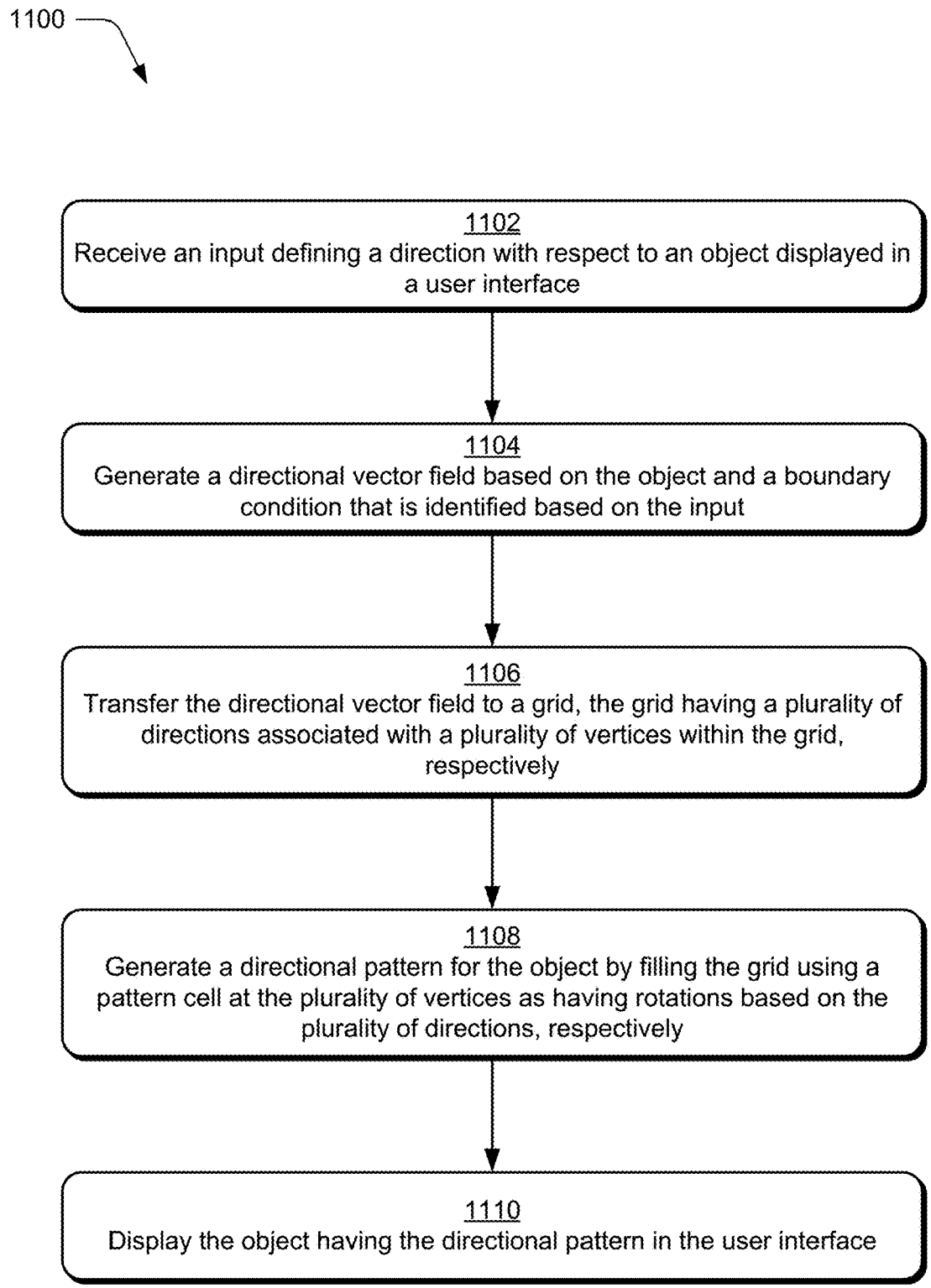
FIG. 11 is a flow diagram depicting a procedure in an example implementation of directional pattern generation.

FIG. 2 depicts a system 200 in an example implementation showing operation of the directional pattern system of FIG. 1 in greater detail to generate a directional pattern. FIG. 3 is an example illustration 300 depicting first, second, and third examples 302, 304, 306 of specifying a direction with respect to an object via interaction with a user interface. FIG. 4 is an example illustration 400 depicting first, second, and third examples 402, 404, 406 of generating a mesh based at least in part of the specified directions of FIG. 3. FIG. 5 depicts an example 500 of a directional vector field generated based on the mesh formed for the first example 402 of FIG. 4. FIG. 6 depicts an example 600 of a directional vector field generated based on the mesh formed for the second example 404 of FIG. 4. FIG. 7 depicts an example 700 of a directional vector field generated based on the mesh formed for the third example 406 of FIG. 4. FIG. 8 depicts an example 800 of transfer of a directional vector field to a grid. FIG. 9 depicts an example 900 of a directional pattern generated based on the grid of FIG. 8. FIG. 10 depicts another example implementation 1000 of directional pattern generation. FIG. 11 depicts a procedure 1100 in an example implementation of directional pattern generation.

The following discussion describes techniques that are implementable utilizing the previously described systems and devices. Aspects of each of the procedures are implemented in hardware, firmware, software, or a combination thereof The procedures are shown as a set of blocks that specify operations performed by one or more devices and are not necessarily limited to the orders shown for performing the operations by the respective blocks. In portions of the following discussion, reference will be made to FIGS. 1-11.

To begin in this example, an input module 202 receives an input 204 via the user interface 110. The input 204 defines a direction with respect to an object 122 displayed in a user interface 110 (block 1102). A variety of techniques are supported by the input module 202 to specify the direction. As shown in a first example 302 of FIG. 3, the direction is specified using curves 308, 310, which are input in a free-form manner (e.g., using a brush or pencil) or using standard Bezier drawing tools, which suit workflows where higher accuracy is desired.

For specifying an emitter as illustrated in the second example 304 and/or an emitter and a sink as depicted in the third example, 306, points 312, 314, 316 in the user interface 110 are specified. As previously described, emitters define a point, from which, pattern cells are emitted and sinks define targets, to which, pattern cells are directed within the directional pattern. The input module 202 is configured to support a variety of techniques to support these inputs 204, examples of which include click-and-drag of representations of corresponding functionality in the user interface 110, specification of a location and then a "right click" to cause output of a contextual menu to specify the point as an emitter or sink, and so forth.

Based on the specified directions, the directional pattern system 116 computes a smooth, tangential directional vector field over a shape (e.g., border or boundary) of object 122. The directional vector field defines field directions based on these controls for points in the interior of the object 122 to be filled in this example. Field directions of the directional vector field are then used by the directional pattern system 116 to apply piece-wise rotation to individual pattern cells 120 for aligning with the field when filling the interior of object 122. In an implementation, the directional pattern system 116 is performed automatically and without user intervention in real time and as such does not involve additional steps from the user. In one such example, the user selects the object 122 to be filled, the pattern cells 120 to be used to fill the object 122, and specified a direction using a corresponding direction control, e.g., curves, emitters, sinks, etc. The directional pattern system 116 also supports specification of additional parameters to customize the directional pattern, including options that are user selectable to control spacing, size and the type of grid for the directional pattern, and so on.

The input 204 specifying the direction is passed from input module 202 to a vector field module 206 to generate a directional vector field 208. To do so, a mesh generation module 210 is first employed to generate a mesh. The mesh generation module 210 begins by triangulating an axis-aligned bounding box of the object 122 (offset outwards by 1 pixel) for performing constrained Delaunay triangulation (CDT). The boundary of the object 122 is sampled adaptively and these points are added as Steiner points before triangulation. Similarly, each specified direction (via a corresponding directional control) is also sampled and the resulting vertices and edges are added as Stenier points.

In a first example 402 of FIG. 4, edges are generated by the mesh generation module 210 by flattening the curves 308, 310. The curves 308, 310 are labelled to establish correspondence between mesh edges, thereby enabling subsequent traversal in the generated mesh.

In the second example 404 the direction is specified at point 312 as a sink and in the third example 406 the direction is specified at point 314 as an emitter and point 316 as a sink. For each point used to specify direction (e.g., emitter or sink), the mesh generation module 210 forms a circle with that point as it's center and adds vertices by uniformly sampling this circle. Examples of the circles based on respective points are shown in the corresponding expanded views 408, 410, 412 to form the mesh. These points are also labelled for identification of boundary conditions as further described below.

This set of vertices and edges is then triangulated by the mesh generation module 210 using CDT, e.g., examples of which are incorporated by reference in their entirety as described by Jonathan Richard Shewchuk. Triangle: Engineering a 2D Quality Mesh Generator and Delaunay Triangulator. In Ming C. Lin and Dinesh Manocha, editors, Applied Computational Geometry: Towards Geometric Engineering, volume 1148 of Lecture Notes in Computer Science, pages 203-222. Springer-Verlag, May 1996. From the First ACM Workshop on Applied Computational Geometry. In an implementation, to promote mesh quality a minimum angle of the triangles is constrained to a predefined threshold, e.g., fifteen degrees. This triangle mesh is used as input for a biharmonic solve, where it is adaptively refined by the vector field module 206 to ensure smoothness of the computed field in the interior of the shape. This may also involve an iterative process in which successively smaller triangles are formed within a mesh of the directional vector field until a number of triangles is reached as corresponding to a plurality of vertices of the grid as further described below.

Based on the input 204, the vector field module 206 then identifies boundary conditions associated with a type of direction that is specified for the input. The directional vector field 208 is then generated by the vector field module 206 based on the object 122 and the identified boundary condition (block 1104). For the curve example above (also referred to as a directional guide) from the first examples 302, 402 of FIGS. 3 and 4, the curve is represented in a variety of ways, an example of which includes a cubic Bezier spline. Tangent directions are computed at points sampled from the curves 308, 310 by the vector field module 206 using a first derivative. This computed direction is expressed as a two-dimensional vector (e.g., "[sinθ, cosθ]") for each sampled point along the curves 308, 310. Each sampled point is also used to define a vertex of the triangle mesh (e.g., added as Steiner points during mesh generation by the mesh generation module 210), which results in a boundary value of the direction at each vertex on the directional vector field 208.

For each direction specified via a point (e.g., emitters and sinks), mesh vertices are sampled from the corresponding circles formed based on the points as shown in FIG. 4. For each such vertex, a direction of normal to the circle at that point is computed by the vector field module 206 and used as a boundary value for that vertex. For emitters, an outward normal direction is used (i.e., "away" from the point) and for sinks an inward normal direction is used, i.e., as a target toward the point. These values are used as boundary conditions to solve for a smooth vector field at remaining vertexes of the mesh to generate the directional vector field 208.

Using the identified boundary conditions, the vector field module 206 generates the directional vector field 208, e.g., in an interior of the object 122, as a smooth two-dimensional vector field over the area of the mesh generated above. The vector field module 206 generates the directional vector field 208 as a solution to a bi-Laplacian equation, where two weights (one for each dimension) are computed for each vertex of the triangle mesh corresponding to the direction of the vector field at that vertex:

$$\Delta^2 w_i = 0$$

where "$w_i$" denotes the variable representing the weights representing the "$i^{th}$" unit vector over each of the mesh vertices in the domain "$\mathcal{D}$". A final direction at a mesh vertex "$p \in \mathcal{D}$" is then an aggregation of unit vectors. Continuing the two-dimensional example above, there are two unit vectors:

$$X(\hat{i}), Y(\hat{j})$$

axis, respectively, and as such the weights are defined for these axis as follows:

$$(w_{\hat{i}}(p), w_{\hat{j}}(p))$$

and therefore minimizing Laplacian energy as follows:

$$\min_{w_i, i=1,\ldots,nz} \sum_{i=1}^{n} \frac{1}{2} \int_{\mathcal{D}} (\Delta w_i)^2 dA$$

where "n" is a number of dimensions in the directional vector field 208. Laplacian energy is minimized subject to boundary conditions which are added as a set of linear constraints.

Tangent directions added as boundary values at specific vertices (in previous step) are used as boundary conditions for the bi-Laplacian solve. Since the tangential field is computed as a solution to bi-Laplacian equation by the vector field module 206, the area of mesh is smooth. During the computation of vector field, the initial triangle mesh may be adaptively subdivided by the vector field module 206 to ensure smoothness of directions at the three vertices of every vertex of the mesh.

FIG. 5 depicts an example 500 of a directional vector field 208 computed for the first examples 302, 402 of FIGS. 3 and 4 in which directions are specified in relation to the object 122 using curves 308, 310. FIG. 6 depicts an example 600 of a directional vector field 208 computed for the second examples 304, 404 of FIGS. 3 and 4 in which directions are specified for the object 122 using a sink. FIG. 7 depicts an example 700 of a directional vector field 208 computed for the third examples 306, 406 of FIGS. 3 and 4 in which directions are specified in relation to the object 122 using an emitter and a sink.

The directional vector field 208 is then passed as an input to a grid transfer module 212. The grid transfer module 212 is configured to transfer the directional vector field 208 to a grid 214 using an embedding module 216. The grid 214 has a plurality of directions associated with a plurality of vertices within the grid 214, respectively (block 1106). Continuing the previous example, a flow field of directions within the directional vector field 208 is uniform throughout the triangle mesh. However, since the mesh itself is adaptively sub-divided to promote this smoothness, in some instance the mesh is not regular or uniform, e.g., with regard to spacing and step size. In such instances, the directional vector field 208 is ill suited as a basis to define patterns, as patterns exhibit uniformity and regularity.

Accordingly, the grid transfer module 212 is configured to transfer the smooth vector field of the directional vector field 208 to the grid 214 of a specified type (e.g., rectangular, triangular, hexagonal, etc.) by superimposing the grid 214 onto a triangle mesh of the directional vector field 208 and sampling field values by an embedding module 216, e.g., using barycentric interpolation. An example 800 of this is illustrated in FIG. 8, in which the grid 214 is a uniform hexagonal grid. Arrows at each vertex of this grid 214 denote a direction of a tangential vector filled at the corresponding vertex.

The grid 214 is then output to a fill module 218 to generate a directional pattern 220 for the object 122 by filling the grid 214 using a pattern cell at the plurality of vertices as having rotations based on the plurality of directions, respectively (block 1108). In the example above, directional vectors are computed at each point on the grid 214. Next, a rotation module 222 is employed to align a principal axis 902 of a given pattern cell 120 with the directional vector specified at each vertex of the grid.

To do so in the illustrated example of FIG. 9, a medial axis transform is used by the rotation module 222 to compute the principal axis 902 of the pattern cell 120 as a straight-edge skeleton of an outline of shapes within the pattern cell 120. Examples of skeletons include a straight-edge skeleton, morphological skeleton, and so on to emphasize geometrical and topological properties of the shape in order to determine the principal axis 902. In one example, this is performed by determining the principal axis 902 based on a line formed as equidistant to boundaries of shapes within the pattern cell 120. After computing the straight-edge skeleton, the straightest sub-skeleton is determined by the rotation module 222 to define the principal axis 902, i.e., the sub-skeleton that has a minimum amount of deviation per unit length.

Since this sub-skeleton is represented using a polyline, the rotation module 222 computes the rotation to be applied to the pattern cell 120 to align it at respective direction defined within the grid 214. Thus, the techniques above include tiling a normal pattern with the addition of a rotation component. In an implementation, the rotation component is computed by averaging directions (i.e., angular field values) at each vertex of a corresponding cell from the grid 214. The use of the rotation component leads to pattern placement as being aligned with directions defined using the directional vector field 208 thereby forming the directional pattern. The object 122 is then rendered by the rendering module 224 for display in a user interface 110 by the display device 112. The object 122 is displayed as having the directional pattern (block 1110) as shown in the example of FIG. 9.

FIG. 10 depicts another example 1000 of directional pattern generation involving another example of an object 122, this time illustrated as a magnet with pattern cells used to indicate a direction of magnetism. The object 122 is received as an input 1002 along with a specification of a direction 1004. The directional pattern system 116 also receives a pattern cell 120. In response, a directional vector field 208 is computed that is a basis to form the directional pattern 118 within the object. A variety of other examples are also contemplated.

Example System and Device

Figure 12:
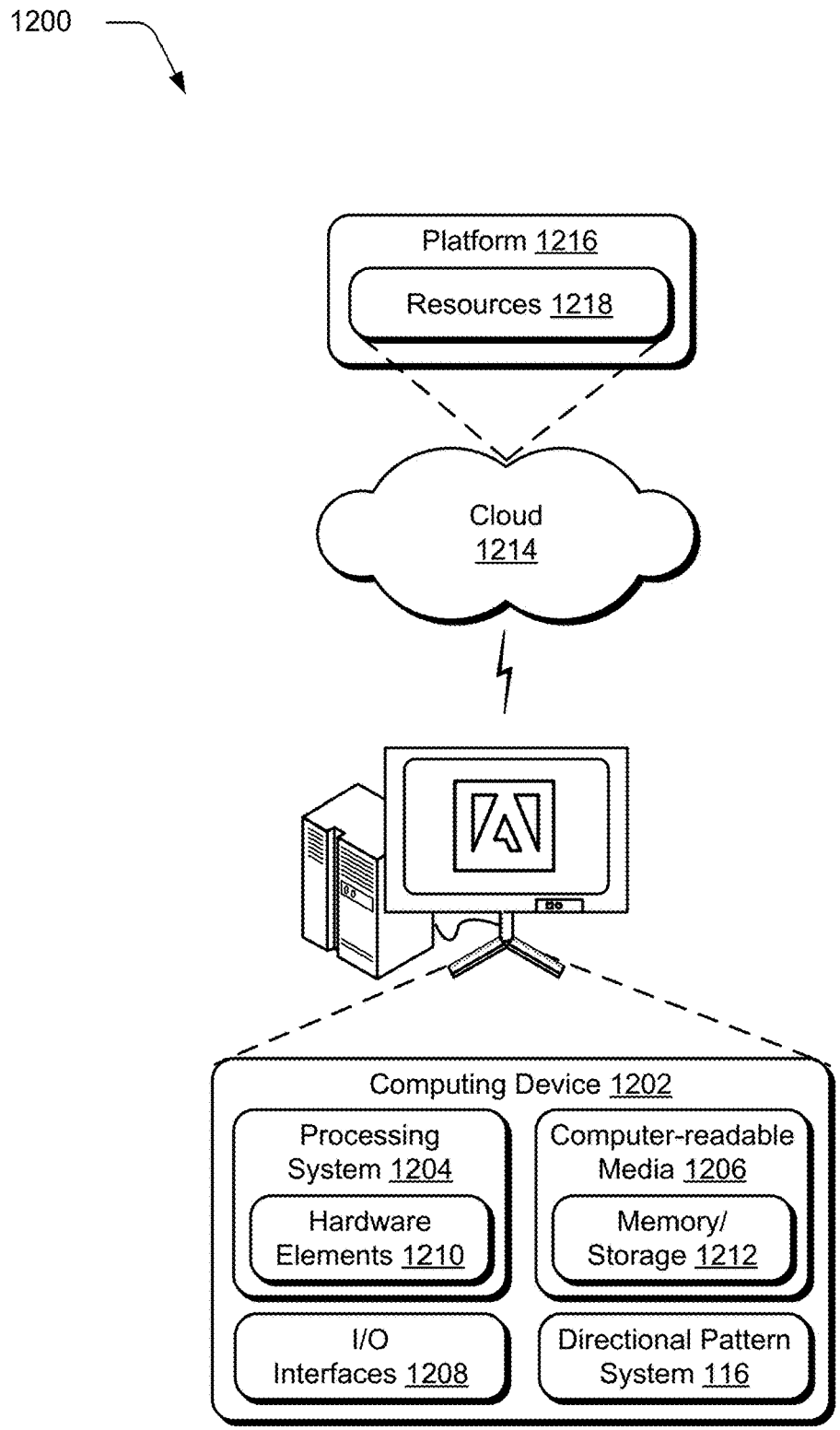
FIG. 12 depicts an example environment that is executable to perform directional pattern generation techniques.

FIG. 12 illustrates an example system generally at 1200 that includes an example computing device 1202 that is representative of one or more computing systems and/or devices that implement the various techniques described herein. This is illustrated through inclusion of the directional pattern system 116. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   receiving, by the computing device, an input defining a direction with respect to an object displayed in a user interface;
   generating, by the computing device, a directional vector field based on the object and a boundary condition that is identified based on the input;
   transferring, by the computing device, the directional vector field to a grid, the grid having a plurality of directions associated with a plurality of vertices within the grid, respectively;
   generating, by the computing device, a directional pattern for the object by filling the grid using a pattern cell at the plurality of vertices as having rotations based on the plurality of directions, respectively; and
   displaying, by the computing device, the object having the directional pattern in the user interface.

2. The method as described in claim 1, wherein the input specifies a spacing of the directional pattern within the grid that is used to determine a number of the plurality of vertices are included as part of the grid within the object.

3. The method as described in claim 1, wherein the input is a direction guide defining the direction using a curve displayed in the user interface.

4. The method as described in claim 3, wherein the boundary condition indicates that vector directions generated for the directional vector field are tangent directions defined at points sampled along the curve.

5. The method as described in claim 1, wherein the input specifies a sink, towards which, the directional pattern is directed within the object.

6. The method as described in claim 5, wherein the sink defines a point within the object and the boundary condition for the sink defines a circle based on the point and the direction is based on a normal defined inward towards the circle.

7. The method as described in claim 1, wherein the input specifies an emitter, from which, the direction pattern is directed within the object.

8. The method as described in claim 7, wherein the emitter defines a point within the object and the boundary condition for the emitter defines a circle based on the point and the direction is based on a normal defined outward from the circle.

9. The method as described in claim 1, wherein the generating the grid has a spacing between the plurality of vertices based on a size of the pattern cell.

10. The method as described in claim 1, wherein the generating the directional vector field is performed iteratively to form successively smaller triangles within a mesh of the directional vector field until a number of triangles is reached as corresponding to the plurality of vertices of the grid.

11. The method as described in claim 1, wherein the transferring the directional vector field to the grid includes superimposing the grid over the directional vector field and sampling values of the plurality of directions associated with the plurality of vertices from the directional vector field.

12. The method as described in claim 1, further comprising determining a principal axis said pattern cell at the vertices;
   wherein the filling includes positioning said pattern cell to have a rotation for the principal axis; and
   wherein the determining a principal axis of said pattern cell at the vertices further comprises computing an average of at least two of said rotations from the grid.

13. The method as described in claim 1, wherein the plurality of vertices of the grid are uniformly space, one to another.

14. A system comprising:
   a processing system; and
   a computer-readable storage medium having instructions stored thereon that, responsive to execution by the processing system, causes the processing system to perform operations including:
      receiving an input via a user interface specifying a direction of a directional pattern within an object, the input including:
         a direction guide specifying the direction using a curve;
         a sink specifying the direction as a target of the directional pattern within the object; or
         an emitter specifying the direction as a source of the directional pattern within the object;
      generating a grid within the object based on the direction, the grid having a plurality of vertices associated with a plurality of directions, respectively, based on the direction;
      generating the directional pattern by filling the grid within the object using a pattern cell at the plurality of vertices as having rotations based on the plurality of directions, respectively; and
      displaying the object as having the directional pattern.

15. The system as described in claim 14, the operations further comprising generating a directional vector field based on the object and a boundary condition that is identified based on the input and wherein the generating of the grid is based on the directional vector field.

16. The system as described in claim 15, wherein the boundary condition for the directional vector field indicates that vector directions generated for the directional vector field are tangent directions defined at points sampled along the curve.

17. The system as described in claim 15, wherein the target of the sink is defined using a point and the boundary condition for the sink defines a circle based on the point and the direction of the directional pattern is based on a normal defined inward towards the circle.

18. The system as described in claim 16, wherein the source of the emitter is defined using a point and the boundary condition for the emitter defines a circle based on the point and the direction of the directional pattern is based on a normal defined outwards from the circle.

19. The system as described in claim 15, the operations further comprising transferring the directional vector field to the grid by superimposing the grid over the directional vector field and sampling values of the plurality of directions associated with the plurality of vertices from the directional vector field.

20. A system comprising:
   means for generating a directional vector field within an object, the directional vector field defining a direction to be used as a basis to generate a directional pattern within the object;
   means for transferring the directional vector field to a grid having a plurality of vertexes that are spaced, one from another, each said vertex associated with a direction based on a corresponding direction of the directional vector field;

means for generating a directional pattern for the object by filling the grid using a pattern cell at the plurality of vertexes as having rotations based on the plurality of directions, respectively; and means for displaying the object having the directional pattern in a user interface.

\* \* \* \* \*

UNITED STATES PATENT AND TRADEMARK OFFICE
CERTIFICATE OF CORRECTION

| | |
|---|---|
| PATENT NO. | : 11,651,536 B2 |
| APPLICATION NO. | : 17/476834 |
| DATED | : May 16, 2023 |
| INVENTOR(S) | : Vineet Batra, Praveen Kumar Dhanuka and Ankit Phogat |

Page 1 of 1

It is certified that error appears in the above-identified patent and that said Letters Patent is hereby corrected as shown below:

In the Claims

Column 13, Line 64, after "principal axis", insert --of--.

Signed and Sealed this
Eighteenth Day of July, 2023

Katherine Kelly Vidal
*Director of the United States Patent and Trademark Office*